United States Patent [19]

Wolf et al.

[11] 3,893,979
[45] July 8, 1975

[54] POLYETHERURETHANES WHICH CONTAIN HYDANTOIN RINGS AND THEIR USE AS ANTISTATIC AGENTS

[75] Inventors: Gerhard Dieter Wolf, Dormagen; Helmut Engelhard, Leverkusen; Francis Bentz, Cologne, all of Germany

[73] Assignee: Bayer Aktiengesellschaft, Germany

[22] Filed: Sept. 14, 1973

[21] Appl. No.: 397,418

[30] Foreign Application Priority Data
Sept. 15, 1972 Germany............................ 2245345

[52] U.S. Cl....... 260/77.5 AQ; 260/309.5; 260/858; 260/859 R
[51] Int. Cl............................................. C08g 22/16
[58] Field of Search.... 260/77.5 CH, 77.5 C, 309.5, 260/77.5 B, 77.5 AM, 77.5 AQ

[56] References Cited
UNITED STATES PATENTS
3,629,263   12/1971   Batzer et al...................... 260/309.5

OTHER PUBLICATIONS
Gaylord, Polyethens, Part I, Interscience, N.Y., 1963, pp. 323 and 324.

*Primary Examiner*—M. J. Welsh
*Attorney, Agent, or Firm*—Plumley & Tyner

[57] ABSTRACT

The invention relates to polyetherurethanes which contain hydantoin rings and their use as antistatic agents for threads, fibers, foils and films produced from polymers. These polyetherurethanes which contain hydantoin rings are particularly noteworthy by combining the following advantages. The presence of the hydantoin rings gives them excellent compatibility with the polymers and in addition they impart to the polymers an antistatic property which is very resistant to washing. Another major advantage of these compounds is that they substantially improve the light fastness of the polymers, evidently due to the presence of the hydantoins.

4 Claims, No Drawings

POLYETHERURETHANES WHICH CONTAIN HYDANTOIN RINGS AND THEIR USE AS ANTISTATIC AGENTS

This invention relates to polyetherurethanes which contain one or more hydantoin rings and their use as antistatic agents for threads, fibres, foils and films produced from polymers.

Shaped polymer products such as fibres made of polyacrylonitrile, polypropylene, polyamides or polyesters all have the disadvantageous property of becoming electrically charged so that their possible technical applications are considerably restricted. Such undesirable electric charging occurs when the surface resistance of the fibres is more than $10^{12}$ ohm.

Numerous methods have already been employed to overcome this difficulty. In many cases, the fibres or textile products produced from them are given a surface treatment with antistatic dressings to increase the electric conductivity, but it is frequently found that the antistatic effect obtained is not sufficiently permanent.

Another method of producing an antistatic finish on fibres consists of applying aqueous solutions of suitable substances while the fibres are in an aquagel state (see German Pat. Nos. 1,469,913 and 1,965,631). The difficulties of this method lie in observing the particular operating conditions required.

It is also known to mix polyacrylonitrile with another acrylonitrile copolymer which contains 30–80% by weight of a polyethylene oxide methacrylate and then to spin this mixture (see German Pat. No. 1,645,532). However, if the mixture contains too high a proportion of polyethylene oxide the fibres tend to go yellow when exposed to heat or light so that additional stabilisers must be introduced into the mixture before spinning to overcome this disadvantage (see German Offenlegungsschrift No. 2,138,839).

Methods which consist of increasing the electric conductivity by copolymerisation of suitable comonomers have the general disadvantage that the characteristic properties of such modified polymers are often substantially altered.

Another method frequently employed for reducing the static charges on polymers consists in adding polyethers or other suitable compounds usually containing polyethers to the solutions or solvent-free melts of these polymers before they are shaped. It is very difficult, however, to find compounds of this type which are both compatible with the given polymers and resistant to washing so that for example they will not be washed out of the fibres made of such polymers even after repeated washing with alkaline detergents. Polyethers and many compounds which contain polyether segments have the additional disadvantage of reducing the light fastness of the polymers to which they are added.

It has surprisingly been found that the disadvantages described above can be obviated by adding new polyetherurethanes which contain hydantoin rings to the polymer substances. These polyetherurethanes which contain hydantoin rings are particularly noteworthy by combining the following advantages. The presence of the hydantoin rings gives them excellent compatibility with the polymers and in addition they impart to the polymers an antistatic property which is very resistant to washing. Thus for example whereas bis-urethanes prepared from a polyetherdiol (molecular weight ≈ 1000) and stearyl isocyanate are practically incompatible with polyacrylonitrile solutions, compounds which have a similar structure but in addition contain a hydantoin ring in accordance with this invention have excellent compatibility with polyacrylonitrile solutions. Another major advantage of these compounds is that they substantially improve the light fastness of the polymers, evidently due to the presence of the hydantoins.

This invention therefore relates to polyetherurethanes which contain one or more hydantoin rings but especially those corresponding to the following general formulae:

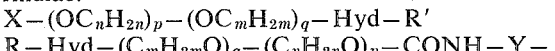
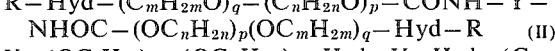
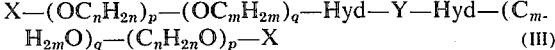

in which
X represents the group

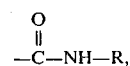

Y represents a bivalent $C_{2-18}$ hydrocarbon group or a $C_{2-18}$ hydrocarbon group substituted with halogen, alkyl, $-NO_2$ or $-CN$, and Hyd represents a bivalent group of the formula

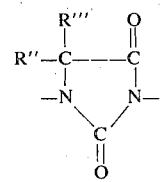

R represents a $C_{1-18}$ alkyl, cycloalkyl, aryl, aralkyl or alkaryl group which optionally is substituted with halogen, alkyl, $-NO_2$ or $-CN$, R' has the same meanings as defined for R above or in addition represents,

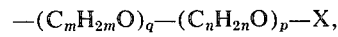

R'' and R''' represent a $C_{1-4}$ alkyl group or aryl group or together represent a $C_{5-6}$ cycloalkyl group and n and m represent an integer of from 2 to 6 and p and q represent O or an integer of from 1 to 50, preferably 5 to 30, but at least either p or q must be greater than 0.

Another object of this invention is the use of the above mentioned polyetherurethanes which contain one or more hydantoin rings for producing antistatic finishes on synthetic threads, fibres, foils and films of polymers such as polyacrylonitrile and its copolymers, polyethylene, polypropylene, polystyrene, polyamides, polyesters, polyurethanes and any of their copolymers. These polymers contain 0.5–15% by weight and preferably 1–10% by weight of the compounds defined above as antistatic finishes.

The most important polymers to which this invention is applicable are polyamides such as those described in "Die Polyamide" by H. Hopff, A. Muller and F. Wenger, Springer Verlag Berlin, Gottingen, Heidelberg, 1954, pages 31, 32 and 153 and in Kunststoff-Handbuch Volume IV, "Polyamide," Carl Hanser Verlag Munich, 1966pages 143 and 144. Other polymers which may be used in accordance with this invention include polyimides, for example those mentioned in German Auslegeschrift No. 1,082,314, in French Pat. No. 1,283,378, in U.S. Pat. Nos. 3,179,634 and 3,300,420 and in British Pat. Nos. 1,009.956; 1,160,097; 1,168,978 and 1,056,564. Polyesters and polyurethanes, e.g., those mentioned in "Fibres from Synthetic Polymers," Rowland Hill, Elsevier Publishing Company, New York N.Y., 1953, pages 144–166, may also be used for producing the end products according to the invention.

The polyetherurethanes with hydantoin rings represented by the general formula I are prepared by known methods, for example as follows: α-aminocarboxylic acid nitriles are reacted with alkyl isocyanates in inert solvents. Cyclisation of the resulting urea derivatives to produce the 3-alkyl-hydantoins may be carried out in solution or suspension, preferably with the aid of acid catalysts, for example a mixture of ethanol and concentrated hydrochloric acid. Polyethoxylation is preferably carried out in the solvent-free melt after addition of a basic catalyst such as an alkali metal hydroxide or alkali metal alcoholate although in principle ethoxylation could also be carried out in solution in an inert solvent, and ethoxylation with glycol carbonate, which has already been described in the literature, has also been found to be suitable.

The hydantoins may be reacted not only with a single alkylene oxide but also with a mixture of two or more alkylene oxides. In that case, the various alkylene oxides are preferably reacted with the hydantoins successively or periodically so that uniform blocks can be formed.

Since the alkylene oxide is not incorporated uniformly in the molecule but statistically, the indices $p$ and $q$ in the formulae represent the average degree of polyaddition of the various alkylene glycol chains with differing lengths.

The method of alkoxylation which is particularly effective for the purpose of this invention and therefore preferred is that of uniform alkoxylation with ethylene oxide but in the case of some compounds it has been found advantageous to precede this ethoxylation with a treatment with propylene oxide.

These polyethers which contain a hydantoin ring are reacted with a monoisocyanate which may be an alkyl, cycloalkyl or aryl isocyanate, preferably stearyl isocyanate, either in solution or solvent-free, to form a urethane group. By employing these methods, the wash resistance of the compound used as additive for polymers is increased.

The hydantoin polyethers may also be used as antistatic additives and the surface resistance of the fibres then obtained by spinning is also sufficiently reduced to eliminate any difficulties in practical use while they are still new but the necessary resistance to conventional detergents is not ensured.

If the polyether which contains a hydantoin ring is reacted with a diisocyanate instead of a monoisocyanate and the reaction is carried out in such a manner that two polyethers containing hydroxyl end groups react with one diisocyanate, then compounds of formula II are obtained. The diisocyanates used may be any known aliphatic or aromatic diisocyanates such as 4,4-diisocyanatodiphenyl methane or hexamethylene diisocyanate.

Polyethers which contain two hydantoin rings as represented by the general formula III may be prepared, for example, by reacting α-amino-carboxylic acid nitriles with a diisocyanate, for example 4,4-isocyanatodiphenylmethane or hexamethylene diisocyanate, in a molar ratio of 2 : 1, preferably in an inert solvent. The resulting diurea can be cyclised to the dihydantoin, preferably in an acid medium. Various processes have been described in the literature but the method which has proved to be the most suitable is that of heating the reactants in a mixture of ethanol and concentrated hydrochloric acid, for example in proportions of 4 : 1. This bis-hydantoin may be polyalkoxylated at the two free NH-groups as described above. To render the whole molecule more hydrophobic, the OH— groups are masked with isocyanates.

Polyetherurethanes with hydantoin rings prepared in this way are added to the spinning solutions or melts of the polymers before they are shaped, the concentrations used being 0.5–15% by weight, preferably 1–10% by weight, based on the polymer.

Manufacture of the threads, fibres, foils or films modified with these additives is carried out by the usual, well-known processes.

The figures given in the examples for the resistance of the fibres according to the invention were obtained using a conventional high-resistance ohmmeter (manufactured by Knick) between the plates of two electrodes placed 1 cm apart at a measuring voltage of 100 V in accordance with Standard Method 54345. Before each determination, the fibres were kept under standard atmospheric conditions of 50% r.h. and 23°C for 72 hours.

Fibres which are modified according to the invention have an electric surface resistance of between $10^{10}$ and $10^{11}$ ohm at 50% r.h. and 23°C. Garments manufactured from such fibres, such as suits, skirts, waistcoats or jackets, show practically no electrostatic charging and show none of the usual phenomena due to electrostatic charging such as sticking of the garments to their hangers, soiling due to the attraction of dust, crackling noises due to discharges or electric shocks. The fibres according to the invention can be dyed with the usual dyes without the excellent antielectrostatic character of the fibres being thereby diminished. The fibres are particularly suitable for use in those products in which subsequent treatment with an antistatic finish would otherwise be necessary, as for example in curtain materials. It is not only found that these products do not attract dust due to static electricity produced by friction but also they do not hold the dust due to the presence of sticky dressings.

The following examples are to further illustrate the invention without limiting it.

EXAMPLE 1

Preparation and antistatic action of

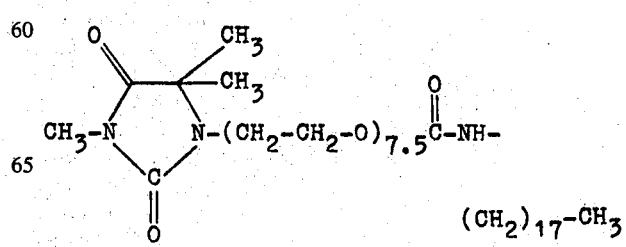

used in polyacrylonitrile.

15 parts by weight of an approximately 10% methanolic solution of sodium methoxide were added to 142 parts by weight of 3,5,5-trimethyl-hydantoin in a three-necked flask equipped with stirrer and distillation condenser attachment. The reaction mixture was slowly heated with stirring to evaporate off the alcohol. The temperature was then raised to 160°–170°C and after displacement of the remaining air with nitrogen, ethylene oxide was introduced until the weight increase was 330 parts by weight. The viscous, yellow oil obtained was cleared by pressure filtration to remove a slight cloudiness. The molecular weight was found by determining the OH number. OH % : 3.7, molecular weight ≈ 460.

100 parts by weight of this polyether were heated to 100°C under an atmosphere of nitrogen, 70 parts by weight of stearyl isocyanate were then added dropwise in the course of 2 hours and stirring was continued for a further 2 – 3 hours at 100°C. The reaction product was taken up with 250 parts by volume of dimethylformamide and again filtered to remove a slight insoluble residue. The solids content of the solution was 41% by weight.

Comparison example

Antistatic action of

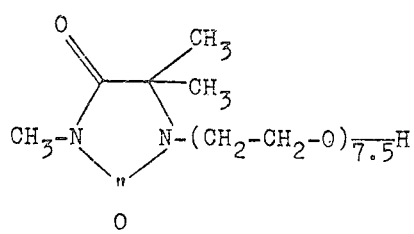

A mixture of 90% by weight of polyacrylonitrile and 10% by weight of the polyethoxylated 3,5,5-trimethyl-hydantoin described in Example 1 was spun dry. The fibres were found to have the following surface resistances:

Fresh fibres: 9 . $10^9$ Ω
After 5 washings: 3 . $10^{11}$ Ω
After the sixth washing, the surface resistance had already increased to 2 . $10^{12}$ Ω and was therefore too high for an antielectrostatic effect.

EXAMPLE 2

Preparation and antistatic action of

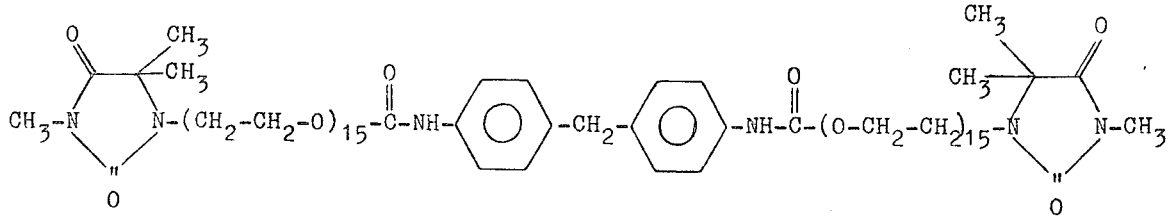

in polyacrylonitrile,

This solution of 3,5,5-trimethyl-1-polyethylene oxide urethane was used to prepare a DMF solution which consisted of a mixture of 90% by weight of a polyacrylonitrile (K-value: 81) and 10% by weight of the polyethoxylated urethane. This solution was spun dry at a viscosity of about 260 poises (85°C). The fibres had a tensile strength of 3.9 g/dtex and an elongation of 15%.

The antielectrostatic effect of the additives was determined by measuring the surface resistance of the fibres at 23°C and 50% relative humidity as already mentioned above. Fresh sample (unbleached): 5 . $10^{10}$ Ω; sample after 10 washings: 3 . $10^{10}$ Ω.

Since the polyacrylonitrile used in the mixture contained an acid additive, the fibres obtained from the mixture could be dyed and then tested to determine whether dyeing reduced the antielectrostatic effect.

The fibres were dyed with the basic dye astrazon red GTL (C.I. Basic red, 18, 11 085) by the usual method used for acrylic fibres and the surface resistance was then again determined and found to be 4 . $10^{10}$ Ω. When the dyed fibres were washed several times and their antielectrostatic properties again determined, the antistatic finish was again found to be permanent since the resistance was found to be 5 . $10^{10}$ Ω.

3,5,5-trimethyl-hydantoin was ethoxylated 15 times as described in Example 1 to produce a product with an OH-content of 2.1% corresponding to molecular weight ≈ 810.

405 parts by weight of the polyether were taken up with 300 parts by volume of dimethylformamide, and a solution of 65 parts by weight of diphenylmethane-4,4'-diisocyanate in 200 parts by volume of dimethylformamide was added dropwise at room temperature. The reaction mixture was stirred for 5 hours and then heated to 60°C in the course of 2 hours.

This solution was used to prepare spinning solutions containing (a) 90% by weight of polyacrylonitrile (PAN) and 10% by weight of diurethane (DU) and (b) 95% by weight of PAN and 5% by weight of DU, and the solutions were spun to produce fibres.

The following results were obtained from measuring the surface resistances (50% r.h., 23°C):

| Fresh fibre: | after 10 washings: |
|---|---|
| a) 5 . $10^{10}$Ω | 4 . $10^{10}$Ω |
| b) 8 . $10^{10}$Ω | 9 . $10^{10}$Ω |

EXAMPLE 3

Preparation and antistatic action of

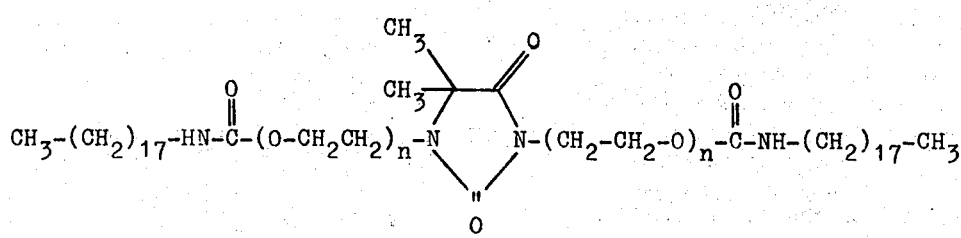

a. $n = 8$,
b. $n = 19$
in polyacrylonitrile.

a. 3 parts by weight of sodium methoxide (95%) were added to 216 parts by weight of 5,5-dimethylhydantoin and the reaction mixture was heated to 130° – 140°C. After displacement of air with nitrogen, ethylene oxide was introduced into this solid mass with stirring, a yellow, viscous oil being gradually formed. The oil was taken up with 620 parts by weight of oxide, nitrogen was again passed through and the molecular weight was found by determining the OH-number.

OH% : 4.2,
molecular weight ≈ 810 $n$ ≈ 8.

150 parts by weight of stearyl isocyanate were added to 200 parts by weight of this compound under a stream of nitrogen at 100° – 120°C in the course of 1 hour and stirring was continued for a further 4 – 5 hours. The product was taken up with 380 g of dimethylformamide at room temperature and stirred until almost completely dissolved. It was then filtered to remove a slight residue (5 parts by weight) and used to prepare a solution in DMF which contained 90% by weight of polyacrylonitrile (K-value 84) and 10% by weight of the adduct described above, calculated on the solids content, and had a viscosity of 280 poises (85°C), and the solution was spun.

The surface resistance of threads spun from the solution and stretched by 1 : 3.8 was $4 \cdot 10^{10} \Omega$ before washing and $6 \cdot 10^{10} \Omega$ after 10 washings with an alkaline detergent.

b. Ethylene oxide was added to 5,5-dimethylhydantoin as described under (a) until the molecular weight was approximately 1860. 465 parts by weight of the resulting polyethylene oxide were reacted with 150 parts by weight of stearyl isocyanate at 100° – 120°C as described above to produce the corresponding diurethane which contained polyethylene oxide units, and after the reaction mixture had been left to react for 5 hours at 110°C it was used to prepare solutions in dimethylformamide which had the following composition based on the solids content:
1. 90% by weight of polyacrylonitrile (K-value 84) and 10% by weight of diurethane;
2. 95% by weight of polyacrylonitrile and 5% by weight of adduct. These solutions were spun dry.

The surface resistance of the fibres ($\Omega$, 50% r.h., 23°C) was as follows:

| Fresh fibres: | after 10 washings |
|---|---|
| 1. $2 \cdot 10^{10} \Omega$ | $2 \cdot 10^{10} \Omega$ |
| 2. $8 \cdot 10^{10} \Omega$ | $10^{11} \Omega$ |

EXAMPLE 4

Antistatic action of

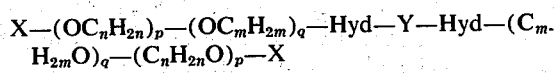

in polyamide.

1% by weight of a bis-urethane of diethoxylated 5,5-dimethyl-hydantoin prepared as described in Example 3 was incorporated in a polyamide-6 melt in an extruder and extruded in the form of cables which were then granulated. The homogenised granulate was worked up in a chip rolling mill to produce fibres with a thickness of 4 dtex. The following results were obtained from measuring the electric surface resistance:

Fresh fibres: $7 \cdot 10^{10} \Omega$;
After 10 washings: $8 \cdot 10^{10} \Omega$.

We claim:
1. Polyetherurethanes containing hydantoin rings corresponding to the general formula

$$X—(OC_nH_{2n})_p—(OC_mH_{2m})_q—Hyd—Y—Hyd—(C_mH_{2m}O)_q—(C_nH_{2n}O)_p—X$$

in which
Y represents a bivalent $C_{2-18}$ hydrocarbon group or a bivalent $C_2$-$C_8$ hydrocarbon group substituted with halogen, alkyl, $—NO_2$ or $—CN$ and
X represents the group

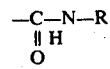

and

Hyd represents a bivalent group of the formula

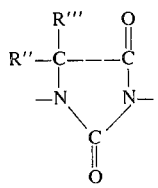

in which
R represents a $C_{1-18}$ alkyl, cycloalkyl, aryl, aralkyl, alkaryl group or such a group substituted with halogen, alkyl, $-NO_2$ or $-CN$, R' has the meanings defined for R or it represents the group $-(C_mH_{2m}O)_q-(C_nH_{2n}O)_p-X$, R'' and R''' represent a $C_{1-4}$ alkyl or aryl group or together represent a $C_{5-6}$ cycloalkyl group and $n$ and $m$ represent an integer of from 2 to 6 and $p$ and $q$ represent 0 or an integer of from 1 to 50, and at least $p$ or $q$ must be greater than 0.

2. Polyetherurethane having the formula

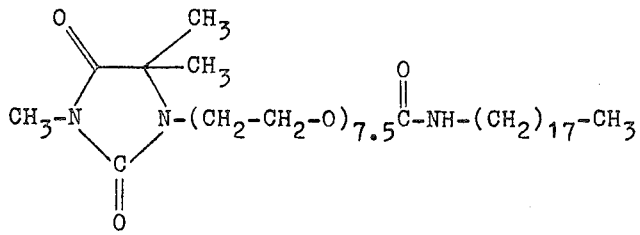

3. Polyetherurethane having the formula in which
Y represents a bivalent $C_{2-18}$ hydrocarbon group or a bivalent $C_2$-$C_{18}$ hydrocarbon group substituted with halogen, alkyl, $-NO_2$ or $-CN$ and Hyd represents a bivalent group of the formula

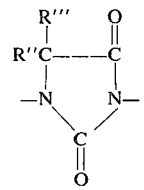

in which
R represents a $C_{1-18}$ alkyl, cycloalkyl, aryl, aralkyl, alkaryl group or such a group substituted with halogen, alkyl, $-NO_2$ or $-CN$, R' has the meanings defined for R or represents the group $-(C_mH_{2m}O)_q-(C_nH_{2n}O)_p-X$, R'' and R''' represents a $C_{1-4}$ alkyl or aryl group or

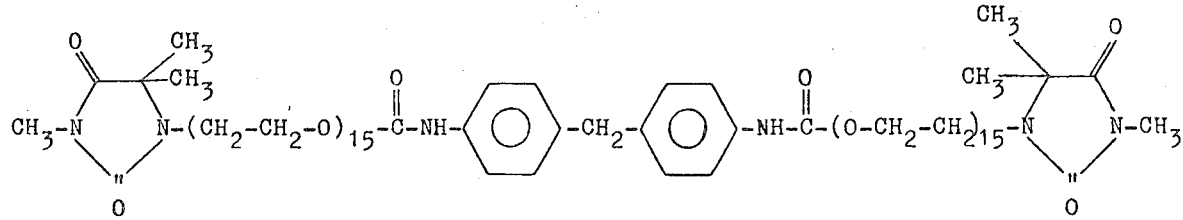

4. Polyetherurethanes containing hydantoin rings corresponding to the general formula R—Hyd—$(C_mH_{2m}O)_q(C_nH_{2n}O)_p$CNH—
$\parallel$
O
Y—NHC—$(OC_nH_{2n})_p(O-C_mH_{2m})_q$Hyd—R
$\parallel$
O together represent a $C_{5-6}$ cycloalkyl group and
$n$ and $m$ represent an integer of from 2 to 6 and
$p$ and $q$ represent 0 or an integer of from 1 to 50, and at least $p$ or $q$ must be greater than 0.

* * * * *

UNITED STATES PATENT AND TRADEMARK OFFICE
CERTIFICATE OF CORRECTION

PATENT NO. : 3,893,979

DATED : July 2, 1975

INVENTOR(S) : Gerhard Dieter Wolf et al

It is certified that error appears in the above-identified patent and that said Letters Patent are hereby corrected as shown below.

Column 3, line 60, "monosocyanate" should be ---monoisocyanate---.

Column 8, line 1, last line the formula should be corrected to read ---

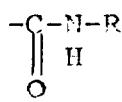

Signed and Sealed this

*thirtieth* Day of March 1976

[SEAL]

Attest:

RUTH C. MASON
*Attesting Officer*

C. MARSHALL DANN
*Commissioner of Patents and Trademarks*